United States Patent Office 3,461,716
Patented Aug. 19, 1969

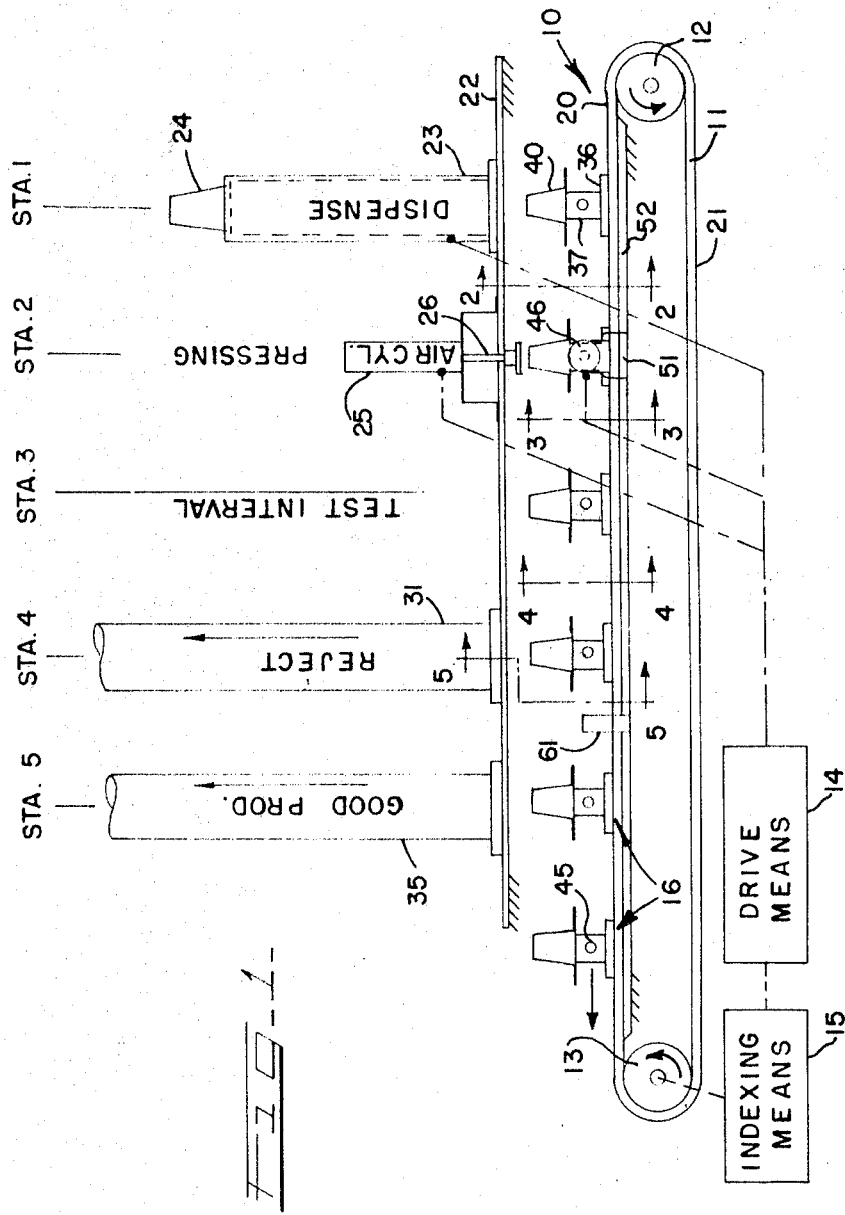

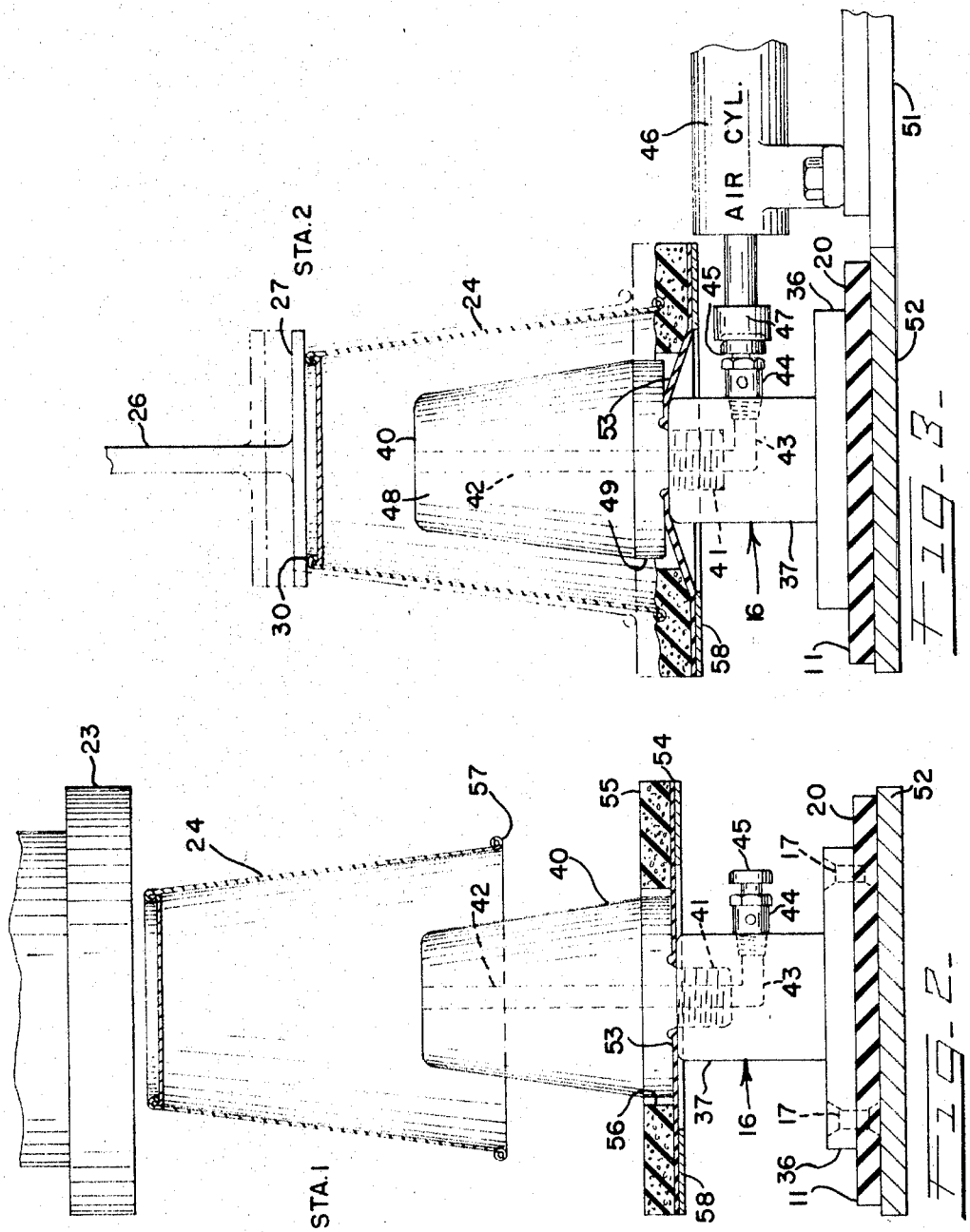

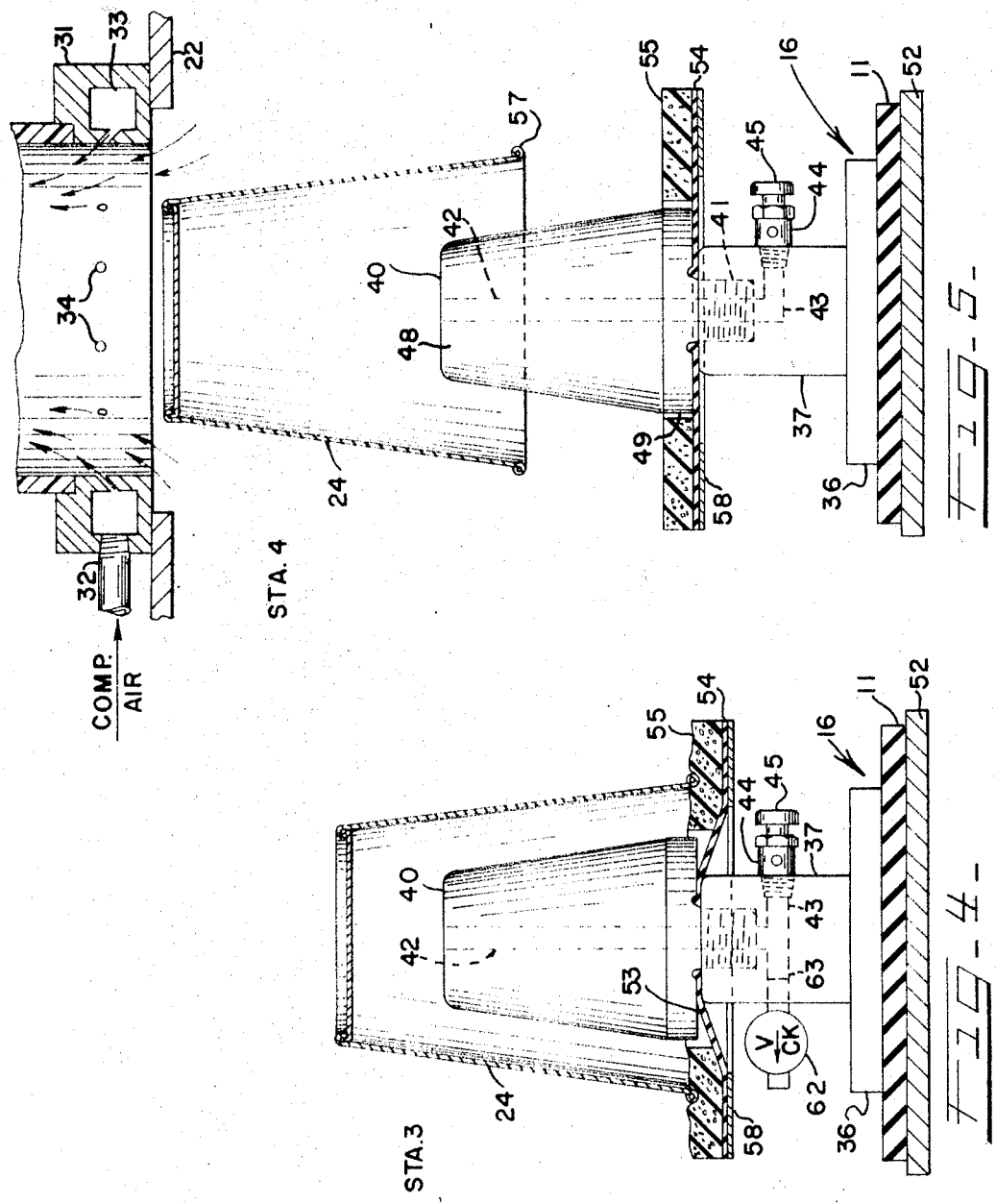

3,461,716
LEAK DETECTOR FOR PAPER CUPS
William W. Thomson, Portage, Mich., assignor to Continental Can Company, Inc., New York, N.Y., a corporation of New York
Filed Aug. 28, 1967, Ser. No. 663,591
Int. Cl. G01m 3/04
U.S. Cl. 73—45.1
3 Claims

ABSTRACT OF THE DISCLOSURE

An apparatus for testing paper cups for leaks having test stands on which cups are placed mouth down in air tight relationship. Some air is forced out of the cups creating a partial vacuum in the cups. A pneumatically operated leaky cup reject tube is provided for removing detected leaky cups from the test stands. The test stands are moved one at a time under the reject tube. If a cup leaks, the partial vacuum therein will disappear; the cup will consequently rest freely on the test stand and will be sucked up into the pneumatic reject tube. If a cup is satisfactory, the suction created by the partial vacuum in the cup will hold it on the test stand sufficiently tight to prevent it from being sucked up into the pneumatic reject tube.

BACKGROUND OF THE INVENTION

Field of the invention

The invention is in the general field of manufacturing containers such as cans, cartons, and paper or plastic cups and tubs. In the manufacture of such containers it has been found that occasionally containers having leaks therein are produced. It is important that any such leaky containers be detected and removed from the production line.

Specifically the invention provides new and novel leak detecting apparatus for detecting leaks in relatively frail containers having a wide mouth such as paper cups or tubs but its use may be extended to performing leak detecting operations on similar type containers made of plastic or metal foil.

Description of the prior art

Machinery for testing relatively strong containers such as metal cans for leaks has now been perfected to a high degree of efficiency. Such machines, commonly called "air testers," subject the cans under test to a relatively high differential air pressure between the interior and exterior during the testing operation. This relatively high differential pressure enables the detection of very minute leaks in the cans.

In the manufacture of relatively frail wide mouth containers such as tubs and cups made from paper, plastic or thin metal foil, special problems are encountered that are not encountered when testing relatively strong containers such as tin cans; hence, machinery for testing such frail containers has not as yet reached the level of perfection of the air testers for cans.

One problem encountered in developing a highly efficient machine for detecting leaks in such frail containers is that the containers must be handled very delicately during the testing operation so that they will not be marred, dented, crushed, bent out of shape or otherwise damaged.

Another problem in perfecting such a machine is due to the undesirability of subjecting the frail containers to a relatively high differential air pressure between the interior and exterior thereof during the testing operation. When the desired low differential air pressure is used it is much more difficult to obtain an accurate differential air pressure between the interior and exterior of each of a series of containers being tested since any small change in differential pressure represents a greater deviation from the desired low differential pressure than would occur when operating with a higher differential pressure between the interior and exterior of the containers.

Still another problem in developing an efficient machine is that the machine must be able to discriminate between leakage occurring through the walls of a paper cup or tub due to the porosity of the paper and a small but objectionable leak.

SUMMARY OF THE INVENTION

Apparatus in accordance with the invention specially suited for performing leak detecting operations on relatively frail containers largely overcomes the immediately above-mentioned problems resulting in a considerable and unobvious advance in the art.

The machine or apparatus of the invention includes at least one novel test stand for receiving containers to be tested; means for dispensing a container to be tested onto each test stand; and, means to firmly press a container on a test stand to effect removal of a predetermined amount of air from within the container. The test stand includes a vertically disposed plug which freely fits into the container for the purpose of displacing air from the container. Encompassing the base of the plug is a circular diaphragm made of a thin elastic material which seals off the base of the plug from the atmosphere. An annular gasket of closed celled foam rubber is attached to the flat surface of the diaphragm that faces the upper tip of the plug. The outer perimeter of the gasket is even with the outer perimeter of the diaphragm and the inner perimeter of the gasket extends slightly outwardly from the perimeter of the base of the plug so as to provide a clearance between the gasket and the plug. The opposite side of the diaphragm is provided with a stiffening ring made of metal or other stiff material which backs up the foam rubber gasket and which acts to prevent the foam rubber gasket from becoming misshapen in use. The plug is provided with an air venting passageway which may be selectably communicated with the atmosphere via a push-button type valve communicating therewith.

In operation a container such as a paper cut is dispensed upside down onto the test stand by the dispenser so that the mouth defining rim of the container rests on the foam rubber gasket. The container sits loosely on the stand initially with the plug extending into the interior of the container. The pressing means now contacts the bottom of the container to press the container mouth rim tightly against the foam rubber gasket so as to seal the container from the atmosphere. As the pressing means continues to press the container further onto the test stand the plug is moved by relative movement of the container thereover further into the container so as to compress the air therein. The air displaced by the additional movement of the plug into the container after the seating of the mouth rim onto the gasket is vented to the atmosphere via the push-button valve which is automatically operated by a suitable valve operating means such as an air cylinder. As the container is pressed onto the stand, the elastic diaphragm is stretched downwardly by the pressure exerted by the container. This sets up elastic recovery forces in the diaphragm tending to urge the container upwardly or axially away from the plug which is coaxially disposed with reference to the axis of the container while the container is on the test stand. Before the pressing means is disengaged from contact with the container, the push-button valve is released so that it is now closed. When the cup is now released by the pressing means, the elastic diaphragm in attempting to return to its normal unstretched condition exerts a force on the container urging it upwardly and axially away from the plug. However, as the container moves slightly upwardly off of the plug a partial vacuum is created in the container of such a degree that the external atmospheric pressure acting on the container will be sufficient to just balance the elastic recovery force of the diaphragm so that the cup will assume a definite fixed position with respect to the plug as long as no air leaks into the container.

If the container has a leak, in a short period of time the air pressure in the container will increase with effect that the stretched diaphragm will continue to recover, forcing the container further upwardly axially off of the plug until normal atmospheric pressure exists in the interior of the container and the diaphragm has returned to substantially its unstretched condition. When this occurs the container will freely rest on the foam rubber gasket.

The test stand having such a leaky container resting freely thereon is positioned under a pneumatically operated leaky container reject tube into which the loosely sitting container is easily drawn by differential air pressure.

In the event that the container does not have an objectionable leak, the partial vacuum existing in the container will result in the etxernal atmospheric pressure on the container holding the container tightly on the test stand so that when the test stand is placed under the reject tube the tight or acceptable container will not be sucked up into the reject tube. The stand next moves under a good product pneumatic tube but before it arrives under this tube, the push-button valve is caused to be opened by a valve operating means which may be in the form of a cam. The opening of the push-button valve allows atmospheric air to enter through the pasageway in the plug which equalizes the air pressure within and without the container causing the leak free container to now rest freely on the test stand so that it will be sucked up by differential air pressure into the good product tube.

The provision of a machine and obvious variations thereof operating as generally above described and having at least one test stand and obvious variations thereof constructed as generally described is an object of the invention.

A further object of the invention is the provision of a test stand and obvious variations thereof generally constructed as immediately above described for testing containers for leaks.

Variations in and more specific objects, advantages and uses of the invention will become apparent upon making reference to the drawings and following detailed description of the preferred embodiment.

BRIEF DESCRIPTION OF THE DRAWINGS

FIGURE 1 is a side elevational view of a preferred form of machine or apparatus embodying the concepts of the invention which is simplified and somewhat diagrammatic in nature so as to not conceal the inventive concepts in a maze of detail;

FIGURE 2 is a vertical fragmentary sectional view to an enlarged scale taken generally along the line 2—2 of FIGURE 1 illustrating a paper cup being dispensed from a dispenser at station 1 of the machine onto a test stand supported on the upper run of a conveyor belt with the cup and portions of the test stand also being shown in section;

FIGURE 3 is a view similar to FIGURE 2 taken generally along line 3—3 of FIGURE 1 showing a cup being pressed firmly down on the test stand at the pressing or second station of the machine;

FIGURE 4 is a view similar to both FIGURES 2 and 3 taken generally along line 4—4 of FIGURE 1 showing a cup on a slightly modified test stand at a third station of the machine at which the cup remains for a sufficient time necessary to detect the smallest leak that would cause the container to be later rejected; and FIGURE 5 is a view similar to FIGURES 2-4 taken generally along line 5—5 of FIGURE 1 showing a defective container being sucked up into a pneumatic reject tube from a test stand upon which it was loosely sitting.

DESCRIPTION OF THE PREFERRED EMBODIMENT

The testing machine embodying the inventive concepts shown in FIGURE 1 is designated generally by the numeral 10. Machine 10 comprises an endless belt 11 entrained about horizontally spaced apart pulleys 12 and 13. Belt 11 and pulleys 12 and 13 are preferably provided with cogs so that there will be no slipping of the belt on the pulleys and the timing of the machine will be properly maintained. Suitable drive means 14 which is preferably a commercially available variable speed type so that the machine speed can be readily adjusted is provided as the main power source for the machine 10. An indexing means 15 which may be one of a number of common indexing drive means commercially available is driven in timed relationship by the drive means 14. Pulley 13 is in turn driven in intermittent fashion in a well known manner by the indexing means 15.

Equally spaced apart in single file order along the endless belt 11 is a plurality of test stands generally indicated at 16. As illustrated in FIGURE 2, each test stand 16 is attached to the belt 11 by means of a pair of rivets 17. For the purpose of simplicity of illustration only six of the test stands 16 have been illustrated along the upper run 20 of the endless belt 11. It is to be understood, however, that additional test stands are disposed along the lower run 21 of the belt 11.

A mounting plate 22 is disposed in parallel relationship with the upper run 20 of the belt 11 and is fixedly positioned somewhat above the path of the test stands. Mounted on the mounting plate 22 at the dispensing station 1 is a paper cup dispenser of conventional design indicated at 23. The dispenser 23 is conventionally operated in timed relationship with respect to the movement of the endless belt 11 by the drive means 14 to dispense a paper cup 24 as shown in FIGURE 2 onto each successive test stand 16 momentarily stationarily positioned thereunder by the action of the indexing means 15 operating the drive pulley 13 of the conveyor belt 11.

At the pressing station, designated station 2, in FIGURE 1, means are provided for pressing a cup positioned on a test stand thereunder, down onto the test stand to force some of the air out from within the cup to create a partial vacuum therein. As illustrated, the pressing means includes a fluid operated cylinder such as the air cylinder 25. Air cylinder 25 has a movable piston rod 26, best shown in FIGURE 3, having a threaded lower end. Threadably mounted on the lower end of the piston rod 26 is a pressing pad 27 which engages the bottom circumferential cup flange 30 and presses the cup 24 downwardly onto the test stand 16 when the piston rod 26 is forced downwardly during operation of the air cylinder 25. The air cylinder 25 is caused to be operated in a conventional manner (not shown) in timed relationship with the movement of the endless belt 11 such as by a cam driven by the drive means 14 controlling the operation of an air flow control valve.

At station 4 of the machine means is provided for disposing of detected leaky cups such as, for example, the pneumatic reject tube 31 mounted on the plate 22 in a conventional manner. As seen in FIGURE 5 the pneumatic reject tube 31 is supplied with compressed air through a pipe 32 which connects into an annular passageway 33. A series of upwardly slanted bores 34 connects the interior of the tube 31 with the annular passageway 33. Compressed air is directed upwardly into the interior of the reject tube 31 through the bores 34 creating a suction adjacent the lower end of the reject tube 31 which is sufficient to lift a leaky cup 24 resting freely on a test stand 16 temporarily indexed under the reject tube by the indexing means 15.

At station 5 of the machine 10, is positioned a means for removing cups that were tested and found to be satisfactory, from a test stand momentarily positioned thereunder. A preferred means for removing such acceptable cups is a pneumatic discharge tube similar in all respects to the pneumatic reject tube 31. Such a good product reject tube designated 35 is fixedly mounted to the plate 22 in a manner similar to the mounting of the reject tube 31 at station 4. Any cup not removed from a test stand 16 at reject station 4 will be removed when it arrives at its next indexed position which is station 5 by means of the suction existing at the lower end of the pneumatic discharge tube 35 for good product.

Each of the test stands 16 includes a mounting plate 36 which is fastened to the endless belt 11 by means of the rivets 17. Centrally disposed on the upper surface of the mounting plate 36 is an upstanding cylindrical support 37. Mounting plate 36 and support 37 are preferably made from a single piece of a suitable material such as, for example, aluminum.

The air displacing plug which is indicated at 40 is frusto-conical in shape and is mounted on the support 37 by axial alignment therewith by means of a threaded connection indicated at 41. Plug 40 has a small diameter free end or tip 48 and a larger diameter base 49.

Plug 40 is provided with an axially extending passageway 42 which communicates with an L-shaped passageway in the support 37 which is indicated at 43. Also communicating with the L-shaped passageway 43 in the support 37 is a push-button valve 44 having a valve operating push-button 45. The passageways 42 and 43 and valve 44 provide air flow control means for selectively permitting or preventing air flow into or out of a container on the test stand.

At the pressing station 2, as illustrated in FIGURE 3, is provided an air cylinder 46 having a piston rod 47. Piston rod 47 is operated in timed relationship with the movement of the endless belt 11 such as by a cam operated air-flow control valve (not shown) through the drive means 14 in a conventional manner. Air cylinder 46 is mounted adjacent the upper run 20 of the endless conveyor 11 on a suitable mounting bracket 51. Mounting bracket 51 is attached to a supporting plate 52 which underlies and supports the upper run 20 of the endless belt 11.

Clamped between the undersurface of the plug 40 and the upper surface of the support 37 is a highly elastic rubber diaphragm indicated at 53. Rubber diaphragm 53 when in its unflexed position as illustrated in FIGURE 2 extends laterally outwardly beyond the base of the plug 40 and has a circular circumferential edge 54.

Extending inwardly from the circumferential edge 54 and attached to the upper surface of the diaphragm 53 is an annular gasket 55. Gasket 55 is preferably made from closed celled foam rubber. The inner peripheral surface 56 of the gasket 55 is spaced from and surrounds the base of the plug 40. The upper surface of the annular gasket 55 provides an air-tight seat for the rolled mouth defining rim of the paper cup 24 which is indicated at 57. The gasket 55 is preferably secured in place on the diaphragm 53 by means of a suitable adhesive but may be otherwise attached if desired. Backing up the gasket 55 is an annular ring in the form of a washer which is preferably made of a relatively rigid material such as metal or stiff plastic which is indicated at 58. Annular ring or washer 58 is either adhesively or otherwise suitably attached to the under surface of the diaphragm 53 so as to prevent the easily deformable foam rubber gasket 55 from becoming misshapen.

As shown in FIGURE 1 a stationary cam 61 is mounted on the supporting plate 52 between machine stations 4 and 5. Cam 61 presses in the push-button 45 of the valve 44 as each of the test stands 16 is indexed from station 4 to station 5 causing the valve to open with the result that the interior of a cup 24 on a stand passing thereby will be communicated with the atmosphere therethrough so as to remove any partial vacuum condition therein.

The stand 16 illustrated in FIGURE 3 is of a slightly modified type in which the air flow control means includes a check valve 62 that is in communication with the passageway 43 via the radially disposed passageway 63 in the support 37. The employment of the check valve 62 eliminates the necessity of operating the push-button valve 44 at station 2, and, as a consequence, air cylinder 46 at station 2 can be eliminated.

OPERATION

Referring to FIGURE 1 of the drawings; when the drive means 14 is suitably energized it will cause the intermittent rotation of the pulley 13 in the direction of the arrow thereon via the indexing means 15. This results in the test stands 16 being moved intermittently from right to left along the upper run 20 of the conveyor 11 at a cyclical rate determined by the speed setting of the variable speed drive means 14.

In the operation of the machine 10 an empty test stand first arrives at station 1 and remains stationarily positioned at station 1 for a predetermined time interval before being indexed by the indexing means 15 to the next station or station 2. While at station 1 the dispenser 23 is operated through the drive means 14 to drop a cup 24 onto the test stand 16 as best illustrated in FIGURE 2. The dropped cup will be in axial alignment with the air displacing plug 40 which will extend into the cup with ample clearance being provided between the interior of the cup walls and the exterior surfaces of the plug.

The test stand 16 now having a cup 24 loosely positioned thereon is next indexed to the pressing station 2 where it comes to rest directly under the pressing pad 27. At station 2 the air cylinder 46 is first caused to be operated through the driving means 14 in a conventional manner, resulting in the outward projection of the piston rod 47 resulting in the piston rod pushing in the push-button 45 of the valve 44 causing the valve 44 to be opened. Next, the air cylinder 25 is similarly caused to be operated in a conventional manner via the drive means 14 to project the piston rod 26 vertically downwardly causing the pressing pad 27 to contact the bottom circumferential cup flange 30 so as to force the cup 24 downwardly. The downward pressing of the cup is first effective to seat the mouth defining rim 57 of the cup in air-tight relationship on the upper surface of the foam rubber gasket 55. As the cup is forced further downwardly the air displacing plug 40 goes further into the cup causing the air in the cup to be compressed slightly. This increase in air pressure within the cup is vented to the atmosphere through the passageways 42 and 43 and the valve 44. When the cup has been fully pressed down on the stand 16, diaphragm 53 will be stretched downwardly which sets up the elastic recovery forces therein tending to lift the cup in a vertical upwardly direction off of the plug 40. Shortly after the piston rod 26 has reached the bottom of its stroke the air cylinder 46 is then caused to be actuated to retract the piston rod 47 which releases the push-button 45 of the valve 44 causing the valve 44 to close. At the time the valve 44 is closed the interior air pressure in the cup 24 is approximately the same as the atmospheric pressure due to the previous venting of the interior of the cup through the valve 44. Shortly after the valve 44 is closed the air cylinder 25 is again actuated so as to retract the piston rod 26 upwardly releasing the pressure of the pressing pad 27 against the bottom circumferential cup flange 30. As soon as this downward pressure on the cup is released, the diaphragm 53 in attempting to return to its normal unstretched state exerts an upward force on the cup tending to lift the cup off of the plug 40. As the cup lifts slightly, a slight vacuum condition will be caused to exist within the cup due to the increase in air space within the cup as a result of the slight relative movement of the cup off of the plug 40. The cup will move upward until the vacuum condition existing therein is of sufficient magnitude that when opposed by the atmospheric air acting on the exterior surfaces of the cup results in the lifting action exerted on the cup by the diaphragm 53 being balanced. As long as no air enters the cup it will remain in this fixed vertical position on the stand 16 with the diaphragm 53 constantly urging the cup upwardly and with atmospheric pressure urging the cup downwardly and in balanced relationship.

Assuming that the modified stand having the check valve 62 as illustrated in FIGURE 4 is at station 2 of the machine, the operation will be somewhat modified. In this case it is not necessary to employ the air cylinder 46 to open the valve 44 as air will be vented from the cup 24 through the check valve 62. As the pressing pad moves downwardly, and air pressures build up within the cup 24, compressed air which, for example, is in excess of 1½ p.s.i. above atmospheric pressure will be vented through the check valve 62 to the atmosphere. When the pressing pad 27 moves upwardly, the check valve 62 immediately closes, preventing air from leaking back through the check valve into the interior of the cup. If the cup is not leaky, it will be lifted slightly upwardly as before by the resiliency of the diaphragm 53 until it assumes a position whereat atmospheric pressure acting on the cup when opposed by the lifting action of the diaphragm 53 and the reduced air pressure within the cup results in a state of equilibrium causing the cup to remain at a stationary elevation on the stand 16.

Upon being released by the pressing pad 27, the cup 24 on a stand 16 at station 2 is advanced by the indexing means 15 over to station 3. The cyclical rate of the indexing means 15 is set to provide an ample test interval time at station 3 for sufficient air leakage through a leak of small dimension in a wall of a cup to cause the tension in the diaphragm 53 to be relaxed with the result that such a leaky cup will rest freely on the stand 16.

If the cup 24 is of a type that is not coated with plastic or wax or other suitable coating material, rendering the paper impermeable to the passage of air, a certain amount of air leak into the cup being tested due to the natural permeability of the paper. Thus, when such a cup is at station 3 for the required test interval, it will slowly be lifted by the resilient force of the diaphragm 53 as atmospheric air slowly permeates the walls of the cup reducing the slight vacuum condition existing in the interior of the cup. When the machine 10 is properly adjusted and driven at the optimum speed the diaphragm 53 will not have sufficient time to return to a relaxed state but will continue to urge the cup upwardly during the entire time that the cup is at station 3. This results in a slight partial vacuum being maintained in the cup during the entire time it is at station 3 resulting in atmospheric pressure acting on the exterior of the cup maintaining the rolled mouth defining rim 57 of the cup firmly seated on the gasket 55 with sufficient force that the cup will not be drawn into the reject tube when the stand is indexed from station 3 to station 4.

Since the cup will also remain at station 4 for the same length of time it remained at station 3, the slow relaxing of the diaphragm 53 will continue while the cup is at station 4. However, when the machine is run at the optimum speed and is properly adjusted, the diaphragm 53 will not have enough time to reach a relaxed state while the cup is at station 4 such that a partial vacuum condition will always be maintained in such a cup that is not a leaker but having walls of air permeable material such as paper during the time that the cup is at station 4.

When such an air-permeable cup on a stand 16 leaves station 4 and moves over to station 5 the slight vacuum condition still existing in its interior is relieved by the opening of valve 44 on its test stand by the action of the fixed cam 61 against the push-button 45 of the valve 44. This acts to relieve substantially all of the tension in the diaphragm 53 and the cup will stand freely on the gasket 55. As the stand with the free cup thereof arrives under the good product tube 35 at station 5 the cup will be lifted off of the stand by differential air pressure created by air jets emanating from bores similar to the bores 34 of the pneumatic tube 31 and will be delivered by the good product pneumatic tube 35 to a nested stack being formed of such good product.

In the event that an air-permeable cup as immediately above described also had an objectional leak therein, the total air-leakage into the cup would have been so great that after the cup left station 2 and before it left station 4 substantially all of the tension would have been relieved in the diaphragm 53. The air pressure within the cup would have reached substantially atmospheric pressure with the result that the cup would have been resting substantially freely on its test stand 16 at station 4 and would have been drawn up into the reject tube 31 as a result of the differential pressure created at the base of the pneumatic tube 31 due to the air jets emanating from the bores 34. Such a defective cup would have been delivered to a stack of such cups being formed adjacent the discharge end of the pneumatic tube 31.

In the event that a cup being tested is made of a material substantially impermeable to the passage of air and does not have any other leaks, it will remain at an elevation on its test stand substantially as shown in FIGURE 4 until such time as the test stand passes between the stations 4 and 5 and the vacuum condition existing within the cup is relieved by the operation of valve 44 by the cam 61. Such a substantially air-tight cup is then lifted in the usual manner at station 5 into the good product tube 35.

By operating the machine 10 at a lower cyclical rate, more time will be available after the cups leave station 2 until just before they leave station 4 for detecting a leak, and smaller leaks can thus be detected by slowing down the machine. On the other hand, there are instances when very small leaks are considered to be of no consequence and by speeding up the machine there will be insufficient testing time between stations 2 and 4 for detecting and rejecting cups having such small and unobjectionable leaks and such cups will eventually be delivered into the good product tube 35.

Another way of adjusting the sensitivity of the machine 10 is by means of the threaded connection between the pressing pad 27 and the piston rod 26 at station 2. When the pressing pad 27 is threaded further downward on the rod 26 it will force the cup 24 further downwardly over the plug 40 and will stretch the diaphragm 53 downwardly to a greater extent than before, when the piston rod 26 reaches its lowest point of travel. Because the cup will now rest at a lower position on the test stand 16, more time will be required for it to be lifted by the resilient force of the diaphragm as a result of air leaking through a hole in a wall thereof than would be required before the downwardly adjustment of the pressing pad took place. Such a downward adjustment of the pressing pad therefore, results in the machine 10 being less sensitive in detecting small leaks.

On the other hand, if it is desired to detect very small leaks, the pressing pad is threaded upwardly on the rod 26 so that when the pressing pad is in its fully lowered position the diaphragm 53 will not be flexed to as great an extent as previously and cup 24 will be at a higher elevation on its stand 16 as it leaves the pressing station 2. Since less vertical movement of the cup on its stand is now required before the cup reaches the elevation where it rests freely on the stand it will arrive at its free standing position in a shorter interval of time as a result of a given size leak than would occur before the pressure pad was adjusted upwardly. This, of course, increases the sensitivity of the machine to detect the occurrence of very small leaks. It also opens the possibility of running the machine at a higher cyclical rate when it is not desired to reject cups having such small leaks.

A further way of adjusting the sensitivity of the machine when check valves like the check valve 62 are employed on the test stands 16 is to replace the check valves with valves operating at either a higher or lower pressure so that the initial partial vacuum condition existing in a container on a test stand will be decreased or increased as desired.

An advantage of the machine 10 is that it is possible to increase the production rate thereof by making the endless belt 11 of a width sufficient to accommodate transverse rows of the test stands 16. In such an event, for example, if there were five test stands in a row across the belt 11, it would be necessary to also provide a like number of dispensers at station 1, pressing pads at station 2; discharge tubes at stations 4 and 5 and valve push-button actuators.

An obvious modification of the machine 10 is that instead of mounting the test stands on a endless belt is to mount them on a rotatable table so that they are moved in single file in a circular path with intermittent motion through the stations 1 through 5 with the elements of these stations being also positioned in a circular arrangement above the path of travel of the test stands.

Although it is preferred to use a pneumatic tube to receive the acceptable and unacceptable cups, by means of another obvious variation of the machine 10, such pneumatic tubes may be dispensed with. In such case the stands 16 carry all of the cups both good and defective around the pulley 13. Any cups found to be defective will fall off as the stands pass around the pulley 13 into a chute or bin provided at a point beneath the pulley 13. Good cups will be held by the partial vacuum therein on the test stands as the test stands move along the lower run 21 of the endless belt 11 until the vacuum is released by means of a fixed cam similar to the cam 61 positioned along the lower run of the conveyor 11. The good cups will also be released into a bin or chute located beneath the lower run 21.

In another obvious variation, the dispenser of station 1 and the presser at station 2 can be combined and positioned beneath the lower run of the endless belt conveyor 11. In this modification as a stand 16 moves along the lower run of the conveyor in the usual intermittent way it comes to rest above the combination dispenser and presser. A cup is then dispensed in an upward direction and pressed into place on the stand 16. As the stand traverses the lower run 21 a defectively leaky cup will eventually lose vacuum and will fall off while a good cup will be held on by vacuum until it is released at a desired location into a chute or bin.

Since it is apparent from the above that the invention is capable of being embodied in various forms in an obvious manner the scope of the invention is not intended to be limited to the details illustrated in the drawings but rather only as limited by the claims.

From the foregoing description of the operation of the invention it will become apparent that the priorly mentioned problems encountered in prior art devices have been largely if not entirely overcome with the result that a considerable and unobvious advance in the art has been achieved.

As an example, even though the containers are of a delicate and easily damaged nature, they are handled very gently throughout the entire operation so that it is highly unlikely that they will be damaged. For instance, the dispenser at station 1 drops the cups one-at-a-time onto the test stands 16 as the test stands arrive therebelow. In falling to these test stands, the rolled mouth defining rim of the cup 57 is fully cushioned as it strikes the soft foam rubber gasket 55 such that no damage can occur to the mouth rim.

The pressing operation at station 2 is relatively light and any internal pressure created in the cup at this time is also very low and is rapidly relieved through the valve 44.

From stations 2 through 4 the cups are subjected to only a slight but accurate differential air-pressure between the interior and exterior thereof which will not result in damage which might otherwise occur were the cups subjected to high pressure.

The invention also provide sufficient sensitivity during the testing operation due to the accuracy of the applied differential pressure so as to distinguish between containers made of air-permeable materials such as paper not having any other source of air leakage therethrough and such a container having a small but objectionable leak therein.

I claim:

1. A machine for leak testing containers, such as paper cups, with a mouth opening defined by a rim comprising:
   a plurality of test stands mounted on a conveyor, each test stand including:
   an air displacing plug freely receivable within a container through the container mouth opening;
   resilient gasket means for seating the container mouth rim in air-tight relationship;
   resilient impervus flat means connected between said gasket means and said plug, and supporting said gasket means;
   normally closed valve means for allowing the air in said container to be connected to ambient air when said valve is open;
   means for intermitently conveying the test stands along a closed path in spaced apart processional order;
   dispensing means adjacent the path for dispensing a container onto said test stand as each test stand arrives beneath the dispensing means and is momentarily stationarily positioned therebelow;
   valve control means further along the path for opening said normally closed valve;
   means positioned at the same place as said valve control means for pressing vertically downward on a container to move the container further downwardly so that the plug enters further into the container, whereby said plug and resilient means displace air from within the container through the opened valve means and a partial vacuum is created within the container when said valve is closed and said pressing means is released;
   a reject means positioned further along the path for moving a leaky container into said reject means;
   means for operating the normally closed valve means on each stand to permit air flow into a satisfactory container on said stand to break the partial vacuum and allow the container to rest freely on the test stand.

2. A machine for leak testing containers, such as paper cups, with a mouth opening defined by a rim as set forth in claim 1, wherein said valid valve control means comprises:
   means provided adjacent the path for operating said normally closed valve means to permit air to be displaced from the container during the period the plug is further entering the container by action of the means for pressing downwardly on the container and then operating said normally closed valve means to prevent air from returning to the container.

3. A machine for leak testing containers such as paper cups, having a mouth opening defined by a rim comprising:
   conveyor means for intermittantly moving a test stand along a closed path;
   a test stand mounted upon conveyor means and having:
   an air displacing plug having a base and a plug end freely receivable into a container through the mouth opening of said container;

an elastic diaphragm extending laterally from said air displacing plug;

a container rim sealing gasket circumscribing the base of the plug and extending to near the edge of said elastic diaphragm, whereby a container resting rim-down on said gasket is substantially hermetically sealed by said gasket, said diaphragm and said plug;

check valve means for permitting air flow out of the container;

second normally closed air flow valve means mounted on said plug base whereby when said valve is opened the inside of said container is connected to the ambient air;

means for applying a force urging relative movement of said container and said plug to push said container further down over said plug and flex said elastic diaphragm, whereby when said container is pushed down, air escapes through the check valve and when said container is released, a partial vacuum is established in said container to hold it to said test stand;

a pneumatic leaky container reject means positioned further along the path for lifting a leaky container into said pneumatic leaky container reject tube; and valve control means along the path of said test stand for opening said second valve to allow the interior pressure of satisfactory leak-free containers to equalize with the pressure of the ambient air.

References Cited

UNITED STATES PATENTS

| | | | |
|---|---|---|---|
| 522,107 | 6/1894 | Clot | 73—45.3 |
| 700,891 | 5/1902 | Block | 73—45.3 |
| 2,309,231 | 1/1943 | Bagley | 73—45.3 |
| 2,352,916 | 7/1944 | Schrader | 73—45.3 |
| 3,382,973 | 5/1968 | Szmereta et al. | 209—74 XR |
| 3,385,433 | 5/1968 | Grimaldi et al. | 209—74 XR |

FOREIGN PATENTS

| | | |
|---|---|---|
| 1,487,835 | 7/1967 | France. |
| 117,156 | 6/1956 | U.S.S.R. |

LOUIS R. PRINCE, Primary Examiner

JEFFREY NOLTON, Assistant Examiner

U.S. Cl. X.R.

73—45.3; 209—74